United States Patent [19]
Yamamoto et al.

[11] Patent Number: 6,123,909
[45] Date of Patent: Sep. 26, 2000

[54] METHOD AND APPARATUS FOR PURIFICATION OF ARGON

[75] Inventors: Takao Yamamoto; Naohiko Yamashita, both of Kobe, Japan

[73] Assignee: Air Liquide Japan, Ltd., Tokyo, Japan

[21] Appl. No.: 09/297,632

[22] PCT Filed: Sep. 4, 1998

[86] PCT No.: PCT/JP98/03977

§ 371 Date: May 4, 1999

§ 102(e) Date: May 4, 1999

[87] PCT Pub. No.: WO99/11437

PCT Pub. Date: Mar. 11, 1999

[30] Foreign Application Priority Data

Sep. 4, 1997 [JP] Japan ................................ 9-239616

[51] Int. Cl.[7] ................ B01D 3/00; C01B 23/00
[52] U.S. Cl. .......... 423/210; 423/220; 423/245.1; 423/247; 423/248; 423/262; 422/171; 422/173; 422/177; 422/198; 203/98; 202/152; 202/158; 202/159
[58] Field of Search .................... 423/262, 210, 423/220, 245.1, 248, 247; 202/152, 158, 159; 203/98; 422/171, 173, 177, 198

[56] References Cited

U.S. PATENT DOCUMENTS

| | | | |
|---|---|---|---|
| 3,181,306 | 5/1965 | Geist | 423/262 |
| 5,412,954 | 5/1995 | Grenier | 62/36 |
| 5,461,871 | 10/1995 | Bracque et al. | 62/24 |
| 5,783,162 | 7/1998 | Tomita et al. | 423/348 |

FOREIGN PATENT DOCUMENTS

| | | |
|---|---|---|
| 0 761 596 A1 | 3/1997 | European Pat. Off. . |
| 1274934 | 9/1961 | France ..................... 23/209 |
| 63-189774 | 8/1988 | Japan . |
| 1-230975 | 9/1989 | Japan . |
| 2-272288 | 11/1990 | Japan . |
| 2-282682 | 11/1990 | Japan . |
| 3-39886 | 2/1991 | Japan . |
| 4-12393 B2 | 3/1992 | Japan . |
| 5-29834 B2 | 5/1993 | Japan . |
| 5-256570 | 10/1993 | Japan . |
| 6-194035 | 7/1994 | Japan . |
| 6-347164 | 12/1994 | Japan . |
| 9-72656 | 3/1997 | Japan . |

OTHER PUBLICATIONS

*CRC Handbook of Chemistry and Physics* 62nd Ed., edited by R. C. Weast et al., CRC Press Inc. Florida USA, ISBN–0–8493–0462–8 p. B–79 and C–371, 1981.

Primary Examiner—Tom Dunn
Assistant Examiner—Timothy C Vanoy
Attorney, Agent, or Firm—Oblon, Spivak, McClelland, Maier & Neustadt, P.C.

[57] ABSTRACT

A process for purifying argon to obtain a high-purity argon from argon gas containing at least nitrogen, carbon monoxide, oxygen, and methane, including a first step of adding air or oxygen to the argon gas in an amount sufficient to oxidize the contained carbon monoxide into carbon dioxide in the presence of a catalyst while maintaining a temperature sufficient to oxidize the contained carbon monoxide without substantially oxidizing the methane, a second step of adding hydrogen into the argon gas obtained in the first step and reacting the contained oxygen with the hydrogen into water in the presence of a catalyst, a third step of removing the carbon dioxide and the water from the argon gas obtained in the second step by use of an adsorbent, and a fourth step of cooling the argon gas obtained in the third step, introducing the argon thus cooled into a distillation column and performing distillation by use of a reflux containing argon as a main component to remove nitrogen, hydrogen, and methane, thereby recovering a high purity argon gas.

15 Claims, 3 Drawing Sheets

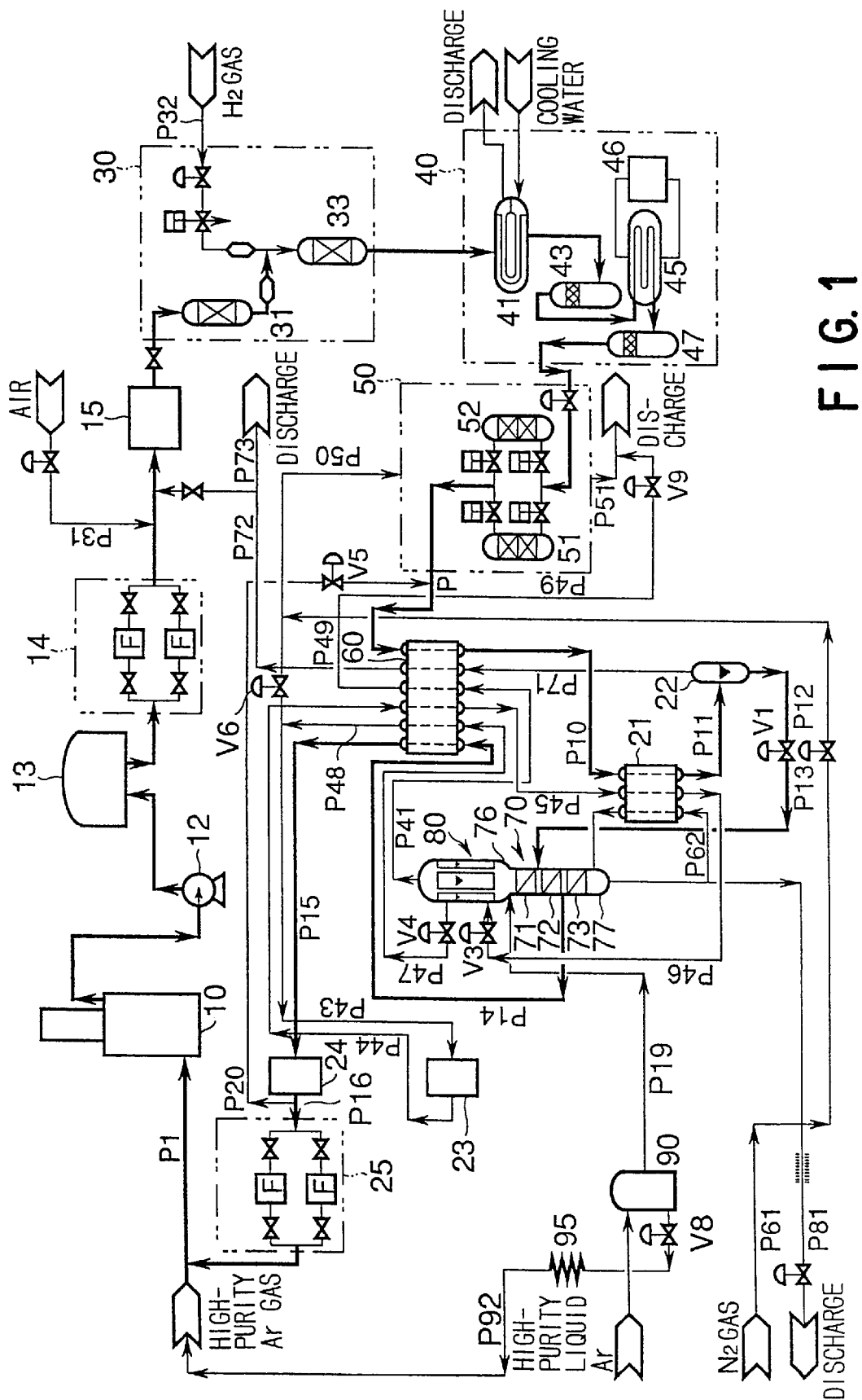
F I G. 1

METHOD AND APPARATUS FOR PURIFICATION OF ARGON

CROSS-REFERENCE TO RELATED APPLICATION

This application is a national stage filing under 35 U.S.C. §371 of PCT/JP98/03977 filed Sep. 4, 1998.

TECHNICAL FIELD

The present invention relates to a purification process for recovering high purity argon gas from argon gas containing impurities, and more particularly, to a process suitable for purifying argon gas discharged from a single crystalline silicon pulling apparatus.

BACKGROUND ART

The single crystalline silicon to be used as a raw material for a semiconductor device is manufactured by a pulling method (Czochralski method). In the single crystalline silicon pulling apparatus (manufacturing apparatus), a large amount of argon gas is supplied into a chamber as a shield gas in order to control an oxygen concentration within the silicon crystal and ensure a purity of the single crystalline silicon to be manufactured. The argon gas discharged from the single crystalline silicon pulling apparatus contains methane ($CH_4$) and other hydrocarbons besides nitrogen ($N_2$), oxygen ($O_2$), carbon monoxide (CO), carbon dioxide ($CO_2$) and the like.

Argon gas (Ar) is present at a concentration of 0.93% in the air and generally purified by cryogenic separation of the air. For this reason, argon gas is relatively expensive. It is therefore desirable that high purity argon gas be recovered from the exhaust gas (argon gas containing impurities) discharged from the single crystalline silicon pulling apparatus by purification, and used again.

Various processes are known to public for purifying the argon gas containing impurities and recovering high purity argon gas. For example, Japanese Patent Application KOKAI publication Nos. 63-189774, 1-230975, 2-272288, and 5-256570 disclose processes for obtaining purified argon gas by removing impurities such as CO, $CO_2$, and $H_2O$ by means of adsorption followed by purifying through cryogenic separation or with a catalyst. Furthermore, in Japanese Patent Application KOKAI publication Nos. 2-282682 and 3-39886, and Japanese Patent Application KOKOKU publication Nos. 4-12393 and 5-29834 disclose processes for recovering argon gas including a step of converting impurities such as CO, $H_2$, and hydrocarbons into $H_2O$ and $CO_2$ with a catalyst.

In the processes for purifying argon gas described in the aforementioned publications, hydrocarbons contained as impurities are removed by oxidizing it with a catalyst into $H_2O$ and $CO_2$. During this step, an excessive amount of $O_2$ is added for facilitating the reaction. In other words, $O_2$ is further added to argon gas, so that a considerable amount of $O_2$ thus added is left after removal of the hydrocarbons. To remove $O_2$ from the argon gas, $O_2$ is reacted with $H_2$ into $H_2O$, and then removed, in a usually employed method. In the oxidation reaction performed with a catalyst, an external heat source is required. Therefore, it may not say that the aforementioned processes are satisfactory methods, in view of energy efficiency.

DISCLOSURE OF INVENTION

The present invention was made under the aforementioned circumstances. An object of the present invention is to provide a process for purifying argon in simplified steps and with a low energy consumption.

The argon purification process of the present invention is a process for purifying argon to obtain a high-purity argon from argon gas containing at least nitrogen, carbon monoxide, oxygen, and methane, comprising:

a first step of adding air or oxygen to the argon gas to oxidize carbon the contained monoxide into carbon dioxide in the presence of a catalyst;

a second step of adding hydrogen into the argon gas obtained in the first step and reacting the contained oxygen with the hydrogen into water in the presence of a catalyst;

a third step of removing the carbon dioxide and the water from the argon gas obtained in the second step by use of an adsorbent; and a fourth step of cooling the argon gas obtained in the third step, introducing the argon thus cooled into a distillation column, performing distillation by use of a reflux containing argon as a main component to remove nitrogen, hydrogen, methane, thereby recovering high purity argon gas.

It is preferable, in the fourth step, that the argon gas obtained in the third step be cooled to liquefy most part of argon and simultaneously to separate and remove hydrogen-condensed argon gas, and then, the liquefied argon be introduced into the distillation column.

The distillation portion of the distillation column preferably consists of an upper stage portion, a middle stage portion, and a lower stage portion. The liquefied argon is introduced into a space between the upper stage portion and the middle stage portion. The argon gas containing nitrogen and hydrogen condensed therein is withdrawn from a top portion of the distillation column. The liquefied argon containing methane condensed therein is withdrawn from a bottom portion of the distillation column. The high purity argon gas is recovered from the space between the middle stage portion and the lower stage portion.

The argon purification apparatus to be used in the aforementioned process is one for obtaining high purity argon from argon gas containing at least nitrogen, carbon monoxide, oxygen, and methane, comprising:

a carbon monoxide oxidation tower for adding air or oxygen into the argon gas and oxidizing the contained carbon monoxide into carbon dioxide in the presence of a catalyst;

a deoxo tower for introducing the argon gas output from the carbon monoxide oxidation tower thereinto and adding hydrogen, thereby reacting the contained oxygen with the hydrogen into water in the presence of a catalyst;

an adsorption tower for introducing the argon gas output from the deoxo tower and removing the carbon dioxide and the water by use of an adsorbent; and a main heat exchanger for introducing the argon gas output from the adsorption tower and cooling the argon gas; and a distillation column for introducing the argon thus cooled and output from the main heat exchanger thereinto and performing distillation by use of a reflux containing argon as a main component to remove nitrogen, hydrogen, and methane, thereby recovering high-purity argon gas.

It is preferable that a gas/liquid separator be arranged between the heat exchanger and the distillation column to separate and remove hydrogen-condensed argon gas from a gas/liquid mixture output from the heat exchanger and introduce the liquified argon into the distillation column.

It is preferable that the distillation portion of the distillation column consist of an upper stage portion, a middle stage portion, and a lower stage portion. The liquified argon is introduced into a space between the upper stage portion and the middle stage portion. The argon gas containing condensed nitrogen and hydrogen is withdrawn from a top portion of the distillation column. The liquid argon containing condensed methane is withdrawn from a bottom portion of the distillation column. The high purity argon gas is recovered from the space between the middle stage portion and the lower stage portion.

According to the process for purifying argon of the present invention, carbon monoxide (boiling point: $-192°$ C.) and oxygen (boiling point: $-183°$ C.), whose boiling points differ a little from that of argon (boiling point: $-186°$ C.), are first converted into carbon dioxide and water, respectively, and then removed. The argon from which carbon monoxide and oxygen have been removed, is introduced into the distillation column, distilled by use of a reflux containing argon as a main component. In this way, low boiling point impurities, namely, nitrogen (boiling point: $-196°$ C.) and hydrogen (boiling point: $-253°$ C.) are withdrawn from the top portion of the distillation column, whereas a high boiling point impurities, namely, methane (boiling point: $-162°$ C.) is withdrawn from the bottom portion thereof. As a result, the high purity argon gas is recovered from a gaseous phase of the middle stage portion of the distillation column.

The differences in boiling point between carbon monoxide and oxygen, and argon are small, so that numerous distillation stages are required if they are separated by use of the distillation column. According to the argon purification process of the present invention, since carbon monoxide and oxygen are converted into carbon dioxide and water and then removed, they can be removed relatively easily. Furthermore, the distillation column is used to remove methane in place of oxidizing methane in the presence of a catalyst as conventionally performed. Since the boiling point of argon greatly differs from that of methane, it is possible to separate methane relatively easily by use of the distillation column.

Consequently, according to the process for purifying argon of the present invention, the process can be simplified compared to the conventional process. Furthermore, the amount of oxygen to be added to argon gas containing impurities in the middle of the processing, can be suppressed at a minimum as compared to the conventional process. Moreover, since an external heat source is not required during the oxidation reaction using a catalyst, the energy consumption of the entire process can be reduced.

It is preferable that high purity liquid argon be supplied to the distillation column from the outside in order to replenish a part of a cold required for the distillation step. Since the cold to be provided from the outside can be thus replenished by argon, the structure of the apparatus can be simplified.

BRIEF DESCRIPTION OF DRAWINGS

FIG. 1 is a flow sheet showing an example of argon purification process according to the present invention;

BEST MODE OF CARRYING OUT THE INVENTION

Figure 2:
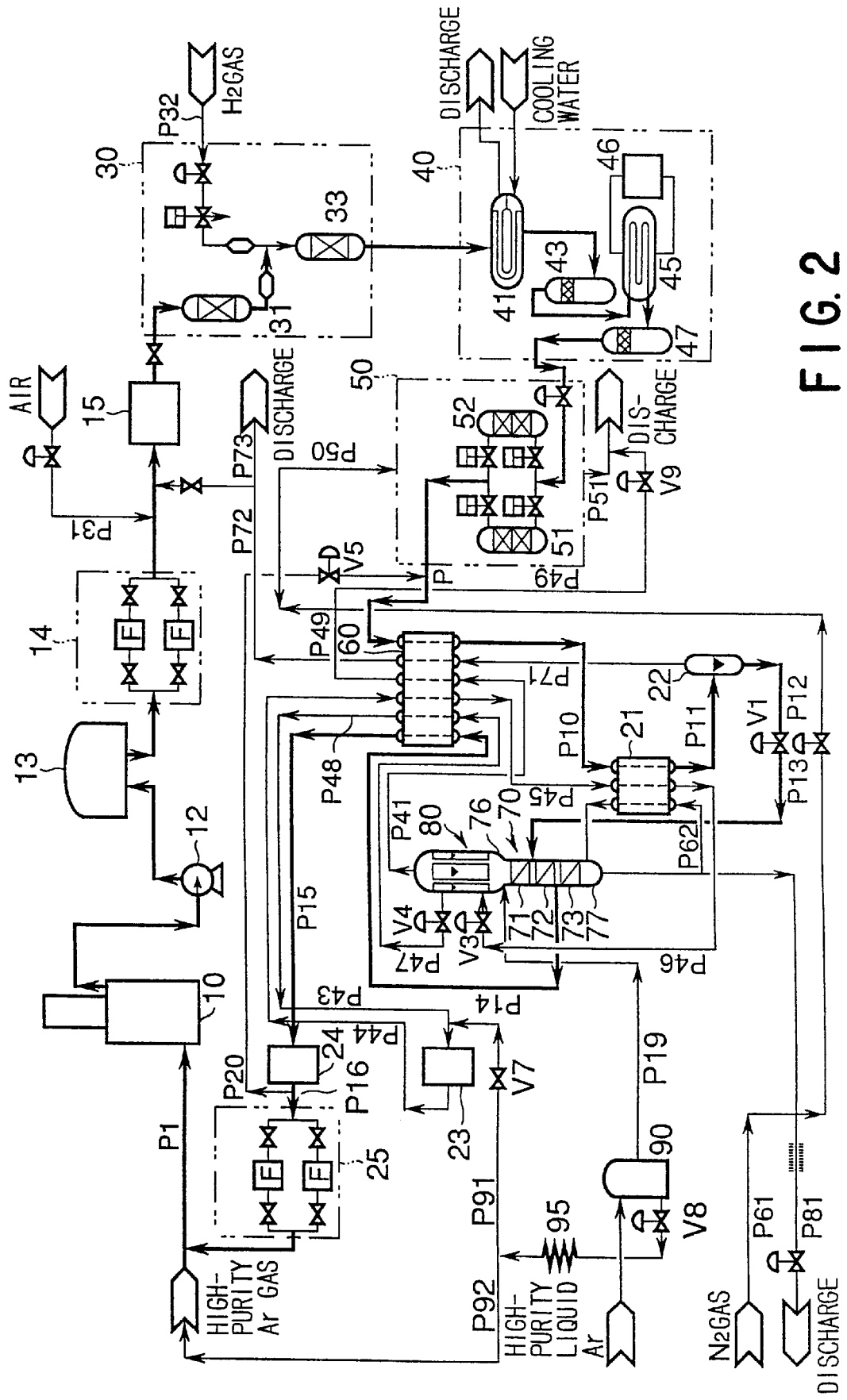
FIG. 2 is a flow sheet showing another example of argon purification process according to the present invention.

FIG. 1 shows an example of a flow sheet of the argon purification process according to the present invention.

The figure shows a single crystalline silicon pulling apparatus (manufacturing apparatus) 10, a preliminary purification unit 30, a cooling unit 40, water and carbon-dioxide removing unit 50, a main heat exchanger 60, a distillation column 70, an argon condenser 80, and a high-purity argon liquid tank 90.

High purity argon gas (boiling point $-186°$ C.) is supplied to the single crystalline silicon pulling apparatus 10 as a shield gas. Gas (hereinbelow, referred to as "argon exhaust gas") discharged from the single crystalline silicon pulling apparatus 10 by a vacuum pump 12 contains impurities such as $H_2$, $N_2$, $O_2$, CO, $CO_2$, and hydrocarbon(s) other than mine dust. The hydrocarbon(s) mainly consisting of $CH_4$ are present in a concentration of 20 vol PPM or less. In this example, a dry seal type pump using a mechanical seal is used as the vacuum pump 12. In FIG. 1, the single crystalline silicon pulling apparatus 10 and the vacuum pump 12 are shown one for each for brevity sake, however, in practice, a plurality of apparatuses are arranged in parallel. Since the argon exhaust gas discharged from the single crystalline silicon pulling apparatus 10 varies in amount depending upon the number of the single crystalline silicon pulling apparatuses 10 in operation, the argon exhaust gas is first stored in a gas holder 13.

The argon exhaust gas stored in the gas holder 13 is introduced into the preliminary purification unit 30 by a compressor 15 through a suction filter unit 14. Note that a flow rate of the argon exhaust gas to be introduced into the preliminary purification unit 30 is set so as to balance with an average flow rate of the argon exhaust gas discharged from the single crystalline silicon pulling apparatus 10. Dust is removed from the argon exhaust gas in the suction filter unit 14. To make up for oxygen required for the following oxidation step, a small amount of air is added to the argon exhaust gas output from the suction filter unit 14, through a pipe P31. Pressure of the argon exhaust gas is increased to about 3.5 to 9.0 kg/cm$^2$G by the compressor 15. The pressure value is set in accordance with the most suitable operation conditions of the following water and carbon-dioxide removing process.

The argon exhaust gas output from the compressor 15 is introduced into the preliminary purification unit 30. The preliminary purification unit 30 has a carbon monoxide oxidation tower 31 and a deoxo tower 33. To the deoxo tower 33, $H_2$ for use in removing oxygen is supplied from a hydrogen gas source arranged outside the system, through a pipe P32. The argon exhaust gas is first introduced into a carbon monoxide oxidation tower 31 in which CO is oxidized into $CO_2$ with a Pd catalyst. Subsequently, $H_2$ is added thereto and the resultant gas is then introduced into the deoxo tower 33. In the deoxo tower 33, the reaction between $O_2$ and $H_2$ is promoted with a Pd catalyst, with the result that $O_2$ is converted into $H_2O$. Note that the flow rate of $H_2$ to be added is set in excess of a theoretically required rate for removing $O_2$ completely from the deoxo tower 33. $H_2$ is added excessively, for example, in an amount of about 0.5 to 1.5 vol % of the argon exhaust gas flow rate.

The argon gas (hereinafter, referred to as "deoxo argon gas") output from the preliminary purification unit 30 is introduced into the cooling unit 40. The cooling unit 40 is constituted of a water cooling type heat exchanger 41, a separator 43, a heat exchanger 45 equipped with a refrigerator 46, and a water separator 47. The deoxo argon gas is first introduced into the heat exchanger 41 to cool to about 40° C. The deoxo argon gas thus cooled is introduced into the wafer separator 43 to separate a condensed moisture content. Subsequently, the deoxo argon gas is cooled to about 10° C. by the heat exchanger 45. The deoxo argon gas thus cooled is introduced into the water separator 47 to further separate a condensed moisture content.

The deoxo argon gas output from the cooling unit 40 is introduced into the water and carbon-dioxide removing unit 50. The water and carbon-dioxide removing unit 50 is constituted of a pair of adsorption towers 51, 52 to be used alternately. The adsorption towers 51, 52 are filled with packing materials such as alumina and a molecular sieve for adsorbing $H_2O$ and $CO_2$. In the water and carbon-dioxide removing unit 50, $H_2O$ and $CO_2$ are removed from the deoxo argon gas.

The pair of adsorption towers 51, 52 are operated by making use of a principle of pressure swing adsorption (PSA) or temperature swing adsorption (TSA). To regenerate the adsorbent, a pipe P50 for nitrogen gas supply is connected the unit 50. Note that the nitrogen gas is supplied by being branched from a nitrogen gas supply line P61. The nitrogen gas used in regeneration of the absorbent is discharged out of the system through a discharge pipe P51.

The deoxo argon gas output from the water and carbon-dioxide removing unit 50 is introduced into the main heat exchanger 60 at a temperature of about 10° C. and a pressure of about 6.4 $kg/cm^2G$. The composition thereof is, for example, $N_2$: 2.0 vol %, $CH_4$: 0.002 vol %, $H_2$: 0.5 vol %, and the rest being argon.

The deoxo argon gas is cooled in the main heat exchanger 60 by exchanging heat with a coolant introduced in an opposite direction. Nitrogen gas (high pressure circulation nitrogen gas) increased in pressure by a compressor 23 described later is also cooled together with the deoxo argon gas in the main heat exchanger 60. Note that, as the coolant, a nitrogen-condensed gas mixture (nitrogen-rich gas) withdrawn from the top portion of the distillation column 70 described later, nitrogen gas (low pressure circulation nitrogen gas) output from an argon condenser 80 described later, and hydrogen-rich gas withdrawn by a hydrogen separator 22 described later, are used.

The deoxo argon gas cooled to near a condensation temperature through the heat exchanger 60 is then introduced into a reboiler 21. The deoxo argon gas is partially liquefied by exchanging heat with liquid argon introduced from a bottom portion 77 of the distillation column described later; at the same time, a reboil gas is discharged from the liquid argon. The deoxo argon contains $N_2$, $CH_4$ as impurities. Besides these, $H_2$ gas is copresents as non condensation gas therein.

The deoxo argon partially liquefied is then introduced into the hydrogen separator 22. In the hydrogen separator 22, a $H_2$-condensed gas mixture (hydrogen-rich gas) is separated from the deoxo argon. The hydrogen-rich gas withdrawn from a top portion of the hydrogen separator 22 passes through a pipe P71 and is introduced as a coolant into the main heat exchanger 60. After heated to normal temperature, the hydrogen-rich gas is returned to the upstream side of the compressor 15 through a pipe 72. The hydrogen-rich gas is used for removing $O_2$ or discharged into the atmosphere through a pipe P73. On the other hand, the liquefied deoxo argon from which the hydrogen-rich gas has been separated, is taken out from the bottom portion of the hydrogen separator 22, introduced into an expansion valve V1 through a pipe P12. After reduced in pressure therein, the liquefied deoxo argon passes through a pipe P13 and is introduced into the space between the upper stage portion 71 and the middle stage portion 72 of the distillation column 70 at a temperature of about −175° C. and a pressure of about 2.2 $kg/cm^2G$.

The distillation column 70 has the argon condenser 80 on the top portion 76. The liquid containing argon as a main component condensed by the argon condenser 80 is returned to the upper stage portion 71 of the distillation column, as a reflux. Furthermore, high purity liquid argon is supplied to the upper stage portion 71 of the distillation column also from the outside. The high purity liquid argon supplied from the outside plays a role in supplying a cold to be required for the distillation process as well as acts as a part of the reflux. While the liquefied deoxo argon introduced into the distillation column 70 flows down through the distillation column 70, it is distilled by coming into contact with the reflux flowing down from the top portion 76 as well as with the reboil gas generated at the reboiler 21 and ascending from the bottom portion 77. As a result, argon gas containing low-boiling point components, namely, $N_2$ and $H_2$, is accumulated at the top portion 76 of the distillation column, whereas liquid argon containing high-boiling point components, namely, condensed hydrocarbons such as $CH_4$, is accumulated at the bottom portion 77 of the distillation column. The high-purity argon gas is recovered from a gaseous phase between the middle stage portion 72 and the lower stage portion 73 of the distillation column.

The hydrocarbons such as $CH_4$ are condensed to, for example, about 100 folds, in the liquid argon accumulated at the bottom portion 77 of the distillation column. A part of the hydrocarbons is discharged out of the system from the bottom portion 77 of the distillation column through the pipe P81.

On the other hand, the argon gas accumulated at the top portion 76 of the distillation column contains $N_2$ and $H_2$. The argon gas is cooled in the argon condenser 80. The liquid containing the condensed argon as a main component is returned to the upper stage portion 71 of the distillation column and used as the reflux. The remaining non-condensation gas (nitrogen rich gas) contains $N_2$ and $H_2$ which are condensed to several-tens of folds. The nitrogen-rich gas passes trough a pipe P41 and is introduced into the main heat exchanger 60 as a coolant. After increased in temperature in the main heat exchanger 60, the nitrogen-rich gas is discharged out of the system through a pipe P49.

The nitrogen gas supplied from the nitrogen gas supply pipe P61 is introduced into the water and carbon-dioxide removing unit 50 through the pipe P50. After used as a regeneration gas for the adsorption towers 51, 52, the nitrogen gas is discharged out of the system.

In this apparatus, nitrogen is used as a circulation fluid for heating the liquid argon accumulated at the bottom portion 77 of the distillation column to generate the reboil gas, and then, cooling the argon gas accumulated at the top portion 76 of the distillation column to produce the reflux, as described below. To be more specific, the nitrogen gas (high pressure circulation nitrogen gas) increased in pressure in the nitrogen circulation compressor 23 is introduced into the main heat exchanger 60 through a pipe P44. After cooled therein, the nitrogen gas is introduced into the reboiler 21 through a pipe P45 as a medium of a heating side. The nitrogen gas is cooled and liquefied in the reboiler 21, introduced into an expansion valve V3 through a pipe P46. After reduced in pressure at the expansion valve V3, the liquified nitrogen is introduced into the argon condenser 80 as a coolant. The liquefied nitrogen is again gasified by exchanging heat with the gas ($N_2$ and $H_2$ containing argon gas) accumulated on the top portion 76 of the distillation column. The gasified nitrogen is further introduced into a pressure control V4. The nitrogen gas reduced in pressure (low pressure circulation nitrogen gas) therein passes through a pipe P47 and is again introduced into the main heat exchanger 60 as a coolant. The nitrogen gas output from the main heat exchanger 60 is partly returned to a pipe P43. In this way, the nitrogen circulation line is constituted. The deficit of the nitrogen gas in the nitrogen circulation line due to leakage from the nitrogen circulating compressor 23 is offset by supplying the nitrogen gas from the nitrogen gas supply line through the pipe P61, a valve V6 and the pipe P43.

The high purity argon gas recovered from the gaseous phase between the middle stage 72 and the lower stage 73 of the distillation column passes through a pipe P14 and is introduced as a coolant into the main heat exchanger 60. Then, the high purity argon gas is raised to normal temperature. Subsequently, the high purity argon gas is introduced into a compressor 24 through a pipe P15 and increased in pressure to, for example, 7 kg/cm$^2$ therein. The high-purity argon gas is then introduced into a filter unit 25 through a pipe P16. After dust particles are removed in the filter unit 25, the high-purity argon gas is returned to the single crystalline silicon pulling apparatus 10.

A branched pipe P20 is connected to the pipe P16 at the downstream side of the compressor 24. The pipe P16 is connected to an inlet pipe P9 for the deoxo argon gas before the main heat exchanger 60 by way of the branched pipe P20 and a flow rate control valve V5. This pipe passage is used for continuing the operation of the distillation column 70 under steady conditions regardless of variation in the number of the single crystalline silicon manufacturing apparatuses 10 in operation, while maintaining the flow rate of the deoxo argon to be supplied to the distillation column 70 at a constant level.

To make up the deficiency of the high-purity argon gas to be circulated through the pipe P1, the high-purity argon gas is supplied from a high-purity liquid argon tank 90 through a pipe P92. To the high purity liquid argon tank 90, high purity liquid argon is supplied from the outside.

It is accomplished to obtain high-purity argon gas (e.g., concentration of each of $H_2$, $N_2$, $CO_2$, $O_2$ and $CH_4$ is 1 vol PPM or less) at a recovery rate of about 90–97% through the process mentioned above.

FIG. 2 shows another example of the argon purification apparatus according to the present invention.

In the apparatus, instead of nitrogen in the apparatus of FIG. 1, argon is used as the circulation fluid to be used in the circulation gas cycle (P43–P47) for generating the reboil gas by heating the liquid argon accumulated at the bottom portion 77 of the distillation column, and then, cooling the argon gas accumulated at the top portion 76 of the distillation column to produce the reflux. In the line for replenishing the circulation fluid, a pipe P91 and a valve V7 are used in place of the valve V6 of FIG. 1. Through this line, argon is replenished from the high-purity liquid argon tank 90.

To increase an operation pressure of the distillation column 70, an operation pressure of the circulation fluid of the circulation gas cycle must be increased. When argon is used as the circulation fluid, since the boiling point of argon under normal pressure is higher by about 10° C. than that of nitrogen, the working pressure of argon is lower then the case of nitrogen gas. Hence, a compressor for general purpose can be used. If the operation pressure of the distillation column 70 is increased, the compressor 24 for product argon may be excluded depending on the situation.

Figure 3:
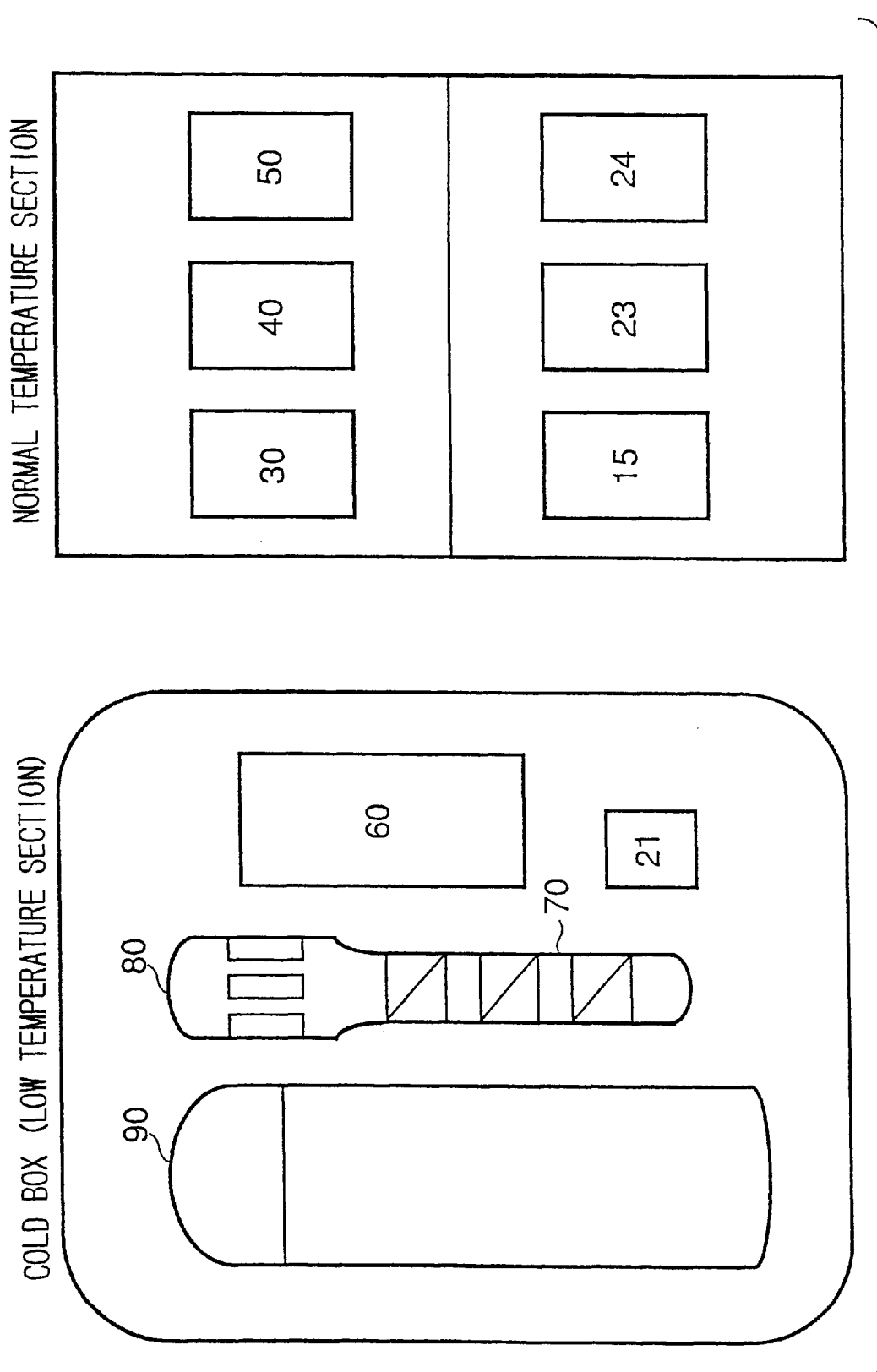
FIG. 3 is a view showing a method how to integrate the argon purification apparatus according to the present invention into a unit.

As shown in FIG. 3, if the main heat exchanger 60, the distillation column 70, the argon condenser 80, the reboiler 21 and the hydrogen separator 22 are integrated as one unit by housing them in a common vacuum container (referred to as "cold box"), heat insulating effect against the outside is enhanced, with the result that energy efficiency of the entire system can be improved. Note that the cold box may house the high-purity liquid argon tank 90 storing high-purity argon gas to be used, for replenishing the cold required for the distillation column 70 and for making up for the deficiency in the circulation gas cycle. Furthermore, if the preliminary purification unit 30, the cooling unit 40, and the water and carbon-dioxide removing unit 50 are integrated together with the compressors 15, 23, 24 in another unit, the entire system can be rendered compact. Such a unit construction as described will contribute to a reduction in construction time at the industrial site.

The process of the present invention can be modified in various ways when necessary. For example, the flow chart shown in FIG. 1 or 2 corresponds to the case where the dry type vacuum pump 12 using a mechanical seal is employed. In the case where an oil seal type pump is used as the vacuum pump 12, it is necessary to add equipment for removing heavy components having carbon atoms of $C_{5+}$ (pentane) or more of hydrocarbons (CnHm), downstream of the vacuum pump 12 and upstream of the preliminary purification unit 60, thereby preventing clogging of the adsorbent at the water and carbon-dioxide removing unit 50.

According to the argon purification process of the present invention, of the impurities, first CO, whose boiling point (boiling point: –192° C.) is very close to that of argon (boiling point: –186° C.), is oxidized into $CO_2$, and then, $O_2$ (boiling point: –183° C.), whose boiling point is very close to that of argon, is converted into water. Then, both components are removed by the cooling unit and the water and carbon-dioxide removing unit. Thereafter, argon (deoxo argon) containing $N_2$ (boiling point: –196° C.), $H_2$ (boiling point: –253° C.) and $CH_4$ (boiling point: –162° C.) as impurities is introduced into the distillation column, to remove $N_2$, $H_2$ and $CH_4$. Since the differences between argon and the impurities in boiling point are large, it is relatively easy to separate these impurities from argon in the distillation column.

According to the argon purification process of the present invention, it is possible to suppress the amount of oxygen to be added to the argon exhaust gas to a minimum level, as compared to a conventional method of removing hydrocarbons such as $CH_4$ by oxidation. Furthermore, heat source is not required for facilitating the reaction.

Hence, according to the argon purification process of the present invention, it is possible to purify the argon exhaust gas with less energy consumption and in relatively simple steps.

What is claimed is:

1. A process for purifying argon to obtain a high-purity argon from argon gas containing at least nitrogen, carbon monoxide, oxygen, and methane, comprising:

a first step of adding air or oxygen to the argon gas in an amount sufficient to oxidize the contained carbon monoxide into carbon dioxide in the presence of a catalyst while maintaining a temperature sufficient to oxidize the contained carbon monoxide without substantially oxidizing the methane;

a second step of adding hydrogen into the argon gas obtained in the first step and reacting the contained oxygen with the hydrogen into water in the presence of a catalyst;

a third step of removing the carbon dioxide and the water from the argon gas obtained in the second step by use of an adsorbent; and a fourth step of cooling the argon gas obtained in the third step, introducing the argon thus cooled into a distillation column and performing distillation by use of a reflux containing argon as a main component to remove nitrogen, hydrogen, and methane, thereby recovering a high purity argon gas.

2. The method of purifying argon according to claim 1, wherein the distillation utilizes high purity liquid argon supplied to the distillation column from the outside as a cooling fluid.

3. The method of purifying argon according to claim 1, wherein argon is used as a circulation fluid for heating liquid argon accumulated in the bottom of the distillation column to generate a reboil gas, and then, argon gas accumulated on a top portion of the distillation column is cooled to generate a reflux.

4. A process for purifying argon to obtain a high-purity argon from argon gas containing at least nitrogen, carbon monoxide, oxygen, and methane, comprising:

a first step of adding air or oxygen to the argon gas in an amount sufficient to oxidize the contained carbon monoxide into carbon dioxide in the presence of a catalyst while maintaining a temperature sufficient to oxidize the contained carbon monoxide without substantially oxidizing the methane;

a second step of adding hydrogen into the argon gas obtained in the first step and reacting the contained oxygen with hydrogen into water in the presence of a catalyst;

a third step of removing the carbon dioxide and the water from the argon gas obtained in the second step by use of an adsorbent;

a fourth step of cooling the argon gas obtained in the third step to liquefy most of the argon, and separating and removing a hydrogen rich gas; and a fifth step of introducing the liquefied argon obtained in the fourth step into a distillation column and performing distillation by use of as reflux containing argon as a main component to remove nitrogen, hydrogen, and methane, thereby recovering the high purity argon gas.

5. The method for purifying argon according to claim 4 wherein:

a distillation portion of the distillation column consists of an upper stage portion, a middle stage portion, and a lower stage portion; and said method comprises introducing the liquefied argon into a space between the upper stage portion and the middle stage portion, withdrawing argon gas containing condensed nitrogen and hydrogen from a top portion of the distillation column, withdrawing liquid argon containing condensed methane from a bottom portion of the distillation column, and recovering the high purity argon gas from the space between the middle stage portion and the lower stage portion.

6. The method of purifying argon according to claim 4, wherein the distillation utilizes high purity liquid argon supplied to the distillation column from the outside as a cooling fluid.

7. The method of purifying argon according to claim 4, wherein argon is used as a circulation fluid for heating liquid argon accumulated in the bottom of the distillation column to generate a reboil gas, and then, argon gas accumulated on a top portion of the distillation column is cooled to generate a reflux.

8. An apparatus for purifying argon to obtain high purity argon from argon gas containing at least nitrogen, carbon monoxide, oxygen, and methane, comprising:

a carbon monoxide oxidation tower for adding air or oxygen in an amount sufficient for the carbon monoxide oxidation into the argon gas and for oxidizing the contained carbon monoxide into carbon dioxide in the presence of a catalyst while maintaining a temperature sufficient to oxidize the contained carbon monoxide without substantially oxidizing the methane;

a deoxo tower for receiving the argon gas output from the carbon monoxide oxidation tower, for adding hydrogen, and for reacting the contained oxygen with the hydrogen into water in the presence of a catalyst;

an adsorption tower for receiving the argon gas output from the deoxo tower and for removing the carbon dioxide and the water by use of an adsorbent;

a main heat exchanger for receiving the argon gas output from the adsorption tower and for cooling the argon gas; and a distillation column for receiving argon thus cooled and output from the main heat exchanger, for performing distillation by use of a reflux containing argon as a main component to remove nitrogen, hydrogen, and methane, and for recovering high-purity argon gas.

9. The apparatus for purifying argon according to claim 8, further comprising a high purity liquid argon tank, wherein the distillation utilizes high purity liquid argon supplied to the distillation column from the high purity liquid argon tank as a cooling fluid.

10. The apparatus for purifying argon according to claim 9, wherein said main heat exchanger, said distillation column, and said high purity liquid argon tank, are housed in an heat insulating container and said carbon monoxide oxidation tower, said deoxo tower, and said adsorption tower, are housed in a framework.

11. The apparatus for purifying argon according to claim 8, wherein said main heat exchanger and said distillation column, are housed in a heat insulating container and said carbon monoxide oxidation tower, said deoxo tower, and said adsorption tower, are housed in a framework.

12. An apparatus for purifying argon to obtain high purity argon from argon gas containing at least nitrogen, carbon monoxide, oxygen, and methane, comprising:

a carbon monoxide oxidation tower for adding air or oxygen in an amount sufficient for the carbon monoxide oxidation in the argon gas and for oxidizing the contained carbon monoxide into carbon dioxide in the presence of a catalyst while maintaining a temperature sufficient to oxidize the contained carbon monoxide without substantially oxidizing the methane;

a deoxo tower for receiving the argon gas output from the carbon monoxide oxidation tower, for adding hydrogen, and for reacting the contained oxygen with the hydrogen into water in the presence of a catalyst;

an adsorption tower for receiving the argon gas output from the deoxo tower and for removing the carbon dioxide and the water by use of an adsorbent; and a main heat exchanger for receiving the argon gas output from the adsorption tower and for cooling the argon gas;

a gas/liquid separator for receiving a gas/liquid mixture output from the main heat exchanger and for separating hydrogen rich gas and liquified argon; and a distillation column for receiving the liquified argon output from the gas/liquid separator, for performing distillation by use of a reflux containing argon as a main component to remove nitrogen, hydrogen, and methane, and for recovering high-purity argon gas.

13. The apparatus of purifying argon according to claim 12, wherein the distilling portion of the distillation column consists of an upper stage portion, a middle stage portion, and a lower stage portion, wherein the liquefied argon output from the gas/liquid separator is introduced into a space between the upper stage portion and the middle stage portion, the argon gas containing condensed nitrogen and hydrogen is withdrawn from a top portion of the distillation column, the liquefied argon containing condensed methane is withdrawn from a bottom portion of the distillation column, and the high purity argon gas is recovered from the space between the middle stage portion and the lower stage portion.

14. The apparatus for purifying argon according to claim 12, further comprising a high purity liquid argon tank, wherein the distillation utilizes high purity liquid argon supplied to the distillation column from the high purity liquid argon tank as a cooling fluid.

15. The apparatus for purifying argon according to claim 12, wherein said main heat exchanger and said distillation column, are housed in a heat insulating container and said carbon monoxide tower, said deoxo tower, and said adsorption tower, are housed in a framework.

* * * * *